(12) United States Patent
Stevison

(10) Patent No.: US 8,548,857 B2
(45) Date of Patent: Oct. 1, 2013

(54) METHOD AND SYSTEM FOR DETECTION OF CREDIT CARD FRAUD

(76) Inventor: William Jennings Stevison, Hamilton, OH (US)

( * ) Notice: Subject to any disclaimer, the term of this patent is extended or adjusted under 35 U.S.C. 154(b) by 260 days.

(21) Appl. No.: 13/179,822

(22) Filed: Jul. 11, 2011

(65) Prior Publication Data

US 2012/0011011 A1   Jan. 12, 2012

Related U.S. Application Data

(60) Provisional application No. 61/363,209, filed on Jul. 10, 2010.

(51) Int. Cl.
*G06Q 20/00*   (2012.01)

(52) U.S. Cl.
USPC .................................. 705/17; 705/16; 705/18

(58) Field of Classification Search
None
See application file for complete search history.

(56) References Cited

U.S. PATENT DOCUMENTS

| | | |
|---|---|---|
| 7,543,741 B2 | 6/2009 | Lovett |
| 7,584,153 B2 | 9/2009 | Brown et al. |
| 7,593,896 B1 | 9/2009 | Flitcroft et al. |
| 7,594,605 B2 | 9/2009 | Aaron et al. |
| 7,606,771 B2 | 10/2009 | Keresman, III et al. |
| 7,620,592 B2 | 11/2009 | O'Mara et al. |
| 7,627,531 B2 | 12/2009 | Breck et al. |
| 7,657,460 B2 | 2/2010 | Findley |
| 7,673,793 B2 | 3/2010 | Greene et al. |
| 7,708,200 B2 | 5/2010 | Helsper et al. |
| 7,716,129 B1 | 5/2010 | Tan et al. |
| 7,716,135 B2 | 5/2010 | Angell |
| 7,720,760 B1 | 5/2010 | Cook et al. |
| 7,721,336 B1 | 5/2010 | Adjaoute |
| 7,810,720 B2 | 10/2010 | Lovett |
| 2008/0201264 A1* | 8/2008 | Brown et al. ................... 705/67 |

* cited by examiner

*Primary Examiner* — Paul Danneman
(74) *Attorney, Agent, or Firm* — Hasse & Nesbitt LLC; Ronald J. Richter; Daniel F. Nesbitt

(57) ABSTRACT

A method and system for detecting and preventing the fraudulent use of credit/debit cards. A number, referred to as a pre-stored Card Identity Key, is typically four or five digits in length, and the final two digits of this number are variable according to a formula which is applied at the time of the attempted transaction. The pre-stored CIK is created by the credit card owner or issued by the card-issuing financial institution, and is maintained in the card-issuing financial institution's computer database and used along with a software routine for validation. The software routine used for validation employs the formula, which is typically created and memorized by the card owner, to generate a dynamic Card Identity Key from the pre-stored Card Identity Key. The dynamic Card Identity Key must be entered by the card holder/user at a merchant terminal for validation of the transaction. Typically the internal time and/or date are displayed on the screen at the merchant terminal at the time the user's credit card is swiped, and at least a portion of the time and/or date shown is utilized in the formula to generate the dynamic Card Identity Key.

17 Claims, No Drawings

METHOD AND SYSTEM FOR DETECTION OF CREDIT CARD FRAUD

CROSS-REFERENCE TO RELATED APPLICATIONS

This application claims priority to U.S. Provisional Application 61/363,209, filed Jul. 10, 2010, the disclosure of which is incorporated herein by reference in its entirety.

FIELD OF THE INVENTION

The present invention relates generally to the credit and debit purchase approval process in retail settings, and more particularly to credit card ownership authentication to simplify checkout and eliminate fraudulent transactions.

BACKGROUND OF THE INVENTION

Credit accounts are convenient and widely used, but they are acutely susceptible to theft. Billions of dollars are lost annually to credit card fraud. Particularly, credit card numbers are copied and used without permission. Within minutes, thieves can purchase thousands of dollars worth of merchandise, and the unsuspecting consumer eventually pays one way or another. Copying may take many forms. A thief may, for example, catch a glimpse of an actual credit card and copy the number by writing the number on a piece of paper. Alternatively, a thief may intercept a digital signal representative of the credit card number and utilize such a digital signal at a later time. It is therefore desirable to provide systems and methods that completely eliminate the possibility for such types of credit card fraud.

There have been many attempts to prevent the illegal or fraudulent use of credit cards and/or debit cards in shopping malls, over the Internet, and at Automated Teller Machines (ATMs). These efforts include Personal Identification Numbers (PINs), the use of mother's maiden names as a secret identification, and requiring credit card holders to use additional ID cards such as a driver license. All attempts to use static information such as these are not completely secure, since such information can be easily learned or stolen and passed on to other users. Once the static identification number is learned, it may be used to make fraudulent credit card purchases until the fraud is detected and the credit card account is closed.

In addition to the PIN system mentioned above, the CVV (card verification and validation) number is an additional security system currently in place for purchases using a credit card where the card is not physically present, such as for internet or telephone transactions. The CVV number may be alternatively called CVV2 or CID (card identification) or CCV (credit card verification or validation) by various credit card companies. The CVV number is typically printed on the back of the credit card, as with MasterCard® or VISA®, but may be on the front of the card, as with American Express®. This number typically uses three digits, but may use four as with American Express®. Merchants are not allowed to store CVV numbers in their database with the credit card number, as a security measure, such that these numbers will not be disseminated if a merchant's database is compromised. Also, since the CVV number is not in the database, each transaction must be accompanied by a new request for the number from the cardholder. Nevertheless, since the CVV numbers are disclosed to the merchants, their employees, and anyone in the communications chain, they may easily be recorded and passed on in a fraudulent manner.

Although systems and methods for validating credit cards and preventing the illegal use of credit cards are known, they all have drawbacks. Some are too complex and require new card types to be issued and new merchant hardware for their use, and others are too easily learned and passed on to other users. There remains a need for a simple verification method for detecting stolen or fraudulent credit card use. In light of this, it would be advantageous to provide a system and method for securing credit card transactions that does not generate information that may be easily determined and passed on to others to generate fraudulent transactions.

SUMMARY OF THE INVENTION

The present invention provides a system for effecting transactions, typically retail transactions, by using a computer software application that generates a number, herein called a Card Identity Key (CIK). The CIK is typically four or five digits in length, depending on whether a debit/ATM card or a credit card is used. The invention solves the problem of fraudulent use of debit/credit cards in shopping malls, over the Internet, and at ATMs. The inventive system is simple, yet when in use will prevent fraudulent use of credit cards.

A first aspect of the invention provides a method for authorizing a credit card transaction, comprising: (a) creating an initial, pre-stored Card Identity Key, the pre-stored Card Identity Key being associated with a customer credit card; (b) storing the pre-stored Card Identity Key in a computer database of a card-issuing financial institution, the computer database containing information associated with the customer credit card and adapted to communicate with a merchant terminal requesting authorization of the customer credit card; (c) employing a software routine for validation of a transaction associated with the customer credit card, the software routine including a formula for changing the pre-stored Card Identity Key to generate a dynamic Card Identity Key; and (d) requiring a number to be entered at the merchant terminal by the card holder for validation of the transaction, wherein the software routine authorizes the transaction by confirming that the number entered by the card holder at the merchant terminal matches the dynamic Card Identity Key generated by the formula.

A second aspect of the invention provides a method for authorizing a credit card transaction, comprising: (a) creating a pre-stored Card Identity Key for use in authorizing a customer credit card, wherein the pre-stored Card Identity Key is composed of digits and is associated with account information displayed on the customer's credit card, and wherein both the account information and the associated pre-stored Card Identity Key are stored in a computer database of a financial institution issuing the credit card; (b) determining a formula for changing the pre-stored Card Identity Key to generate a dynamic Card Identity Key; (c) swiping the customer credit card through an optical scanner at a merchant terminal in order to authorize a transaction with the credit card, the optical scanner adapted for reading the account information displayed on the customer credit card; (d) requesting input of the dynamic Card Identity Key at the merchant terminal; (e) comparing the dynamic Card Identity Key entered at the merchant terminal with the dynamic Card Identity Key generated by the formula; (f) validating that the dynamic Card Identity Key which was entered at the merchant terminal matches the dynamic Card Identity Key generated by the formula; and (g) authorizing the transaction based on the validation that the dynamic Card Identity Key which was entered at the merchant terminal matches the dynamic Card Identity Key generated by the formula, wherein the authorizing step comprises the financial institution sending an authorization for the credit card transaction to the merchant.

A third aspect of the invention provides a system for generating a sales transaction, comprising: (a) a terminal for communicating with the computer database of a card-issuing financial institution, the computer database containing information associated with a customer credit card, the terminal comprising: (i) an optical scanner adapted for reading customer account information displayed on the customer credit card; (ii) a keypad for entering information into the terminal; and (iii) a display device for displaying transaction information; (b) a pre-stored Card Identity Key comprising digits; and (c) a formula for changing at least one digit of the pre-stored Card Identity Key to generate a dynamic Card Identity Key, wherein the optical scanner reads the customer account information from the customer credit card and the terminal communicates with the computer database of the card-issuing financial institution to obtain approval for the transaction.

Typically the formula and the pre-stored Card Identity Key are created by the cardholder, but the card-issuing financial institution can also determine the formulae and pre-stored CIK associated with each credit card they issue. Also, there can be multiple formulae stored in the card-issuing financial institution's database for a particular card and used by the cardholder to convert the pre-stored CIK to the dynamic CIK, if desired.

In a preferred embodiment, the internal time and date are displayed at the merchant terminal and utilized in the formula to perform the validation. Typically the last two digits of the pre-stored Card Identity Key are the only variable digits, and are changed by the formula to generate the dynamic Card Identity Key. However, in one embodiment the first digit of the pre-stored Card Identity Key can also be variable, and correspond to which one of multiple stored formulae are used to convert the pre-stored CIK to the dynamic CIK.

These and further objects, features, advantages and characteristics of the locking device of the present invention will be more fully appreciated upon viewing the following detailed description of the preferred embodiments, and the claims.

DETAILED DESCRIPTION OF THE INVENTION

The present invention is a method and system for validating a debit, ATM or credit card transaction to catch fraudulent use of such cards, as well as protecting against identity theft.

As defined herein, the term "digit" means one of the ten Arabic number symbols, 0 through 9, or such a symbol used in combination to form numbers in a system of numeration.

As defined herein, the term "formula" means a rule, typically stated as an equation, and which may use symbols or words. As a non-limiting example, a formula used according to the present invention can be: "minutes displayed+a pre-stored number", or "seconds displayed+pre-stored CIK."

As defined herein, the term "merchant terminal" means a merchant checkout counter. The terminal typically includes a display device for displaying transaction information, an optical scanner or other means for reading and/or entering customer account information displayed on the customer credit card, and a keypad for physically entering information into the terminal. The merchant terminal is typically connected via a global computer network to a central computer database for at least one card-issuing financial institution. For example, the merchant terminal can be a checkout counter at a shopping mall, an ATM machine, or a website on the Internet. The merchant terminal display device typically includes a computer screen, which also displays the current time and date to the customer.

Typically, when a customer is at a merchant terminal, the customer's debit/credit/ATM card is swiped at an optical scanner or otherwise used to enter or provide information about the customer account associated with that card. A payment amount is then entered by the clerk or the customer. At this point a verification process is begun that identifies the customer and the card the customer wishes to use for the payment transaction. According to the present invention, the customer's card is associated with its own pre-stored Card Identity Key ("pre-stored CIK"), which is a number comprised of multiple digits, typically four or five digits, which has previously been created (e.g. by the customer) and stored in the computer database of the card-issuing financial institution. The card can be a credit card, debit card, or ATM card.

According to a preferred embodiment of the invention, the initial pre-stored CIK is created by the credit card owner or issued by the card-issuing financial institution, maintained in the card-issuing financial institution's computer database, and used along with a software routine to validate a transaction request relating to the owner's credit card. The software routine used for validation then employs a formula, typically created and/or provided by the card owner, to generate a dynamic Card Identity Key ("dynamic CIK"). The pre-stored CIK is converted to the dynamic CIK according to the terms of the formula. A number which matches (i.e. is identical to) the dynamic CIK is then required to be entered by the card holder/user at the ATM, sales desk, or merchant terminal for validation of the transaction. If the dynamic CIK generated by the formula matches the number entered by the card holder at the merchant terminal, then the transaction is approved.

As an initial non-limiting example, a pre-stored CIK comprising a five digit number is created and associated with a customer credit card. To create the pre-stored CIK, the card owner might use something easy to remember, such as their local area code as the first three digits and "00" as the next two digits. Thus, if the area code is 513, then the pre-stored CIK would be 51300.

Typically the final two digits of the pre-stored CIK are variable, and are changed by the formula to generate the associated dynamic CIK. The dynamic CIK is generated by a software routine associated with the card-issuing financial institution's computer database. This software routine employs the formula to determine the dynamic CIK. At the merchant terminal, the card holder is asked to enter a number matching the dynamic CIK, in order to validate the transaction. The merchant terminal then communicates the number entered by the card holder to the card-issuing financial institution's computer database, and the software routine validates whether or not the number entered by the card holder matches the dynamic CIK generated from the pre-stored CIK.

Typically, one aspect of the time or date is used in the formula to convert the pre-stored CIK to the dynamic CIK. The time and date are therefore preferably made visible to the card holder by a display device at the merchant terminal. To ensure that the proper number relating to the time or date is used, the time and date displayed at the terminal are preferably "frozen" on screen at the time the user's credit/debit card is swiped. This allows the card owner to see the pertinent time and date, and then select the portion of the time and date that is part of their chosen formula. These numbers are then applied to the formula, and the dynamic CIK can be calculated by the card owner at the merchant terminal. Thus, in the above example, if the pre-stored CIK is 51300 and the formula is: "minutes+pre-stored CIK" (which means "add the minutes of the day to the final two digits of the pre-stored CIK"), and if the time was 09:48:23, such that the minutes are "48", then the dynamic CIK would be 51348.

Considering the above example, it can appreciated that using zeroes as the final two digits of the pre-stored CIK makes it uncomplicated and easy for the card owner to mentally determine their dynamic CIK, yet a thief or otherwise fraudulent user would not be able to guess the dynamic CIK without knowing the pre-stored CIK or the formula. This would be true even if the pre-stored CIK were somehow known to the fraudulent user, since they would not know the formula. Also, it can be appreciated that there is an unlimited number of formulae that can be used.

As another example, the formula may include varying the final two digits of the pre-stored CIK by adding the cardholder's age to the actual value of minutes displayed at the merchant terminal (i.e. the formula="age+minutes+pre-stored CIK"). Thus, if the card owner's pre-stored CIK is 51300 as earlier, and the cardholder is 30 years old, and the time displayed on the merchant terminal is 12:03:22 pm, then the two variable digits would equal 33 (30+03). The correct dynamic CIK would thus be 51333, and that would be the only acceptable dynamic CIK that could be entered by the card holder at the terminal. Any other entered number would result in the refusal of the transaction.

In the example above, where the formula changes the dynamic CIK from minute to minute, the CIK to be entered would change again when the time changed to 12:04:00 (i.e to 51334). This is an important aspect. With the pre-stored CIK established in the computer, the card holder/user swipes the credit card at the merchant terminal, freezing the time on the screen, and the terminal requests input of the dynamic CIK. The dynamic CIK entered by the card holder is compared to the card owner's pre-stored CIK for validation. Even if the CIK has been written on the credit card by the card owner prior to the card being lost or stolen, any would-be user/thief of the card would not be able to use the card if they did not know the formula created for use by the card owner.

As noted above, when the credit card owner's card is swiped, the merchant terminal requests a number (i.e. the dynamic CIK) to be entered by the card holder. The dynamic CIK is also determined or generated at that time by a software routine using the formula and the pre-stored CIK on file with the card-issuing financial institution's computer database. The dynamic CIK generated by the software routine is then compared to the number entered by the user at the merchant terminal. Comparison and subsequent validation or refusal of the transaction, based on the number (i.e. the dynamic CIK) entered at the merchant terminal, is practically immediate.

The pre-stored CIK is typically four or five digits in length, depending on whether a debit/ATM card or a credit card is used. The first two or three digits can typically be something easy for the card owner to remember. This makes it simple for the card owner to use the keypad at the merchant terminal while checking out the time or date that is displayed on the merchant terminal's computer screen. Once the dynamic CIK is entered by the card holder, the software program will initially compare the number's first two digits (of a four-digit CIK) or three digits (of a five-digit CIK) entered against the first two or three digits of the pre-stored CIK. The final two digits of the CIK are variable and are the most important, and are typically determined by the merchant terminal's computer date and/or time. Depending on which aspect of time is used in the formula, the final two digits could make the CIK invalid within a minute, an hour, a day, etc., depending on what the card owner has specified in the formula they selected. The objective of the formula used is to determine the dynamic CIK number to be entered at the merchant terminal and to enable the dynamic CIK to be validated against the pre-stored CIK by the software routine, the end result being the reduction of illegal use of customer credit cards, debit cards or ATM cards.

While the final two digits of the pre-stored CIK are typically the digits that are variable and controlled by the formula selected, in one embodiment of the invention the first digit is also variable. In this manner, the card owner can set up multiple formulae to be used to convert the pre-stored CIK to the dynamic CIK, and the first digit could indicate or identify which of the formulae are used in the CIK calculation. This would let the card owner change the formula each day, or even each time they use the card, if they choose. The second digit (and the third digit, if a five digit CIK) would typically not be variable, and could be the card owner's favorite number, age, anniversary date, birthday, year graduated, year born, etc. For example, if the cardholder has created 5 formulae, then first number of their pre-stored CIK can be 1, 2, 3, 4, or 5, each of which will direct the software routine to employ a different formula, as associated with that particular number. Thus, using the above example in which the pre-stored CIK was 51300, in this situation the pre-stored CIK could be [1-5] 1300. If the first formula created, i.e. the formula for entering a "1" as the first digit is: "minutes+pre-stored CIK", and the time is 09:48:23, then the dynamic CIK would be 11348. If the second formula created, i.e. the formula for entering a "2" as the first digit is: "seconds+pre-stored CIK", and the time is 09:48:23, then the dynamic CIK would be 23+21300, or 21323. Entering a "3" as the first digit would cause the software routine to apply the customer's third formula, thus adding a number to 31300, and so on.

If someone steals the cardholder's credit card, or finds their lost credit card, the finder or attempted fraudulent user will be unable to access the credit card account since they must have knowledge of the pre-stored CIK and the formula, and the corresponding dynamic CIK must be entered at the transaction terminal. After some number of failed attempts to fraudulently use the credit card, the computer will temporary disable or flag the account in the card-issuing financial institution's computer database until the rightful owner calls to report a loss or correct a mistake. If someone tries to fraudulently use the card, the merchant terminal will give no indication to the user until the card-issuing financial institution's processing center rejects the purchase back to the merchant. Also, should the cardholder lose their card, they can call the card-issuing financial institution and the credit card may be invalidated in their database prior to any attempted fraudulent use of the card.

Some prior art systems include having the merchant terminal require you to input a zip code, or a CCV; however, if a fraudulent user knows the card owner's zip code or CCV (typically printed on the card), they can charge the card in abundance. With the present invention, while the card owner may inform a user (i.e. a non-owner of the card) about the specific formula and pre-stored CIK to be used, such information would typically not be given to anyone except a trusted friend or family member, and certainly could not be correctly guessed or previously known by a thief or other individuals attempting to use a lost or stolen card. As noted, by applying the formula to the pre-stored CIK, the dynamic CIK to be entered may not be the same as it was one minute ago, or not the same as it was yesterday, or a week ago, depending on which formula the card owner chooses. The card owner will have the capability to change to a new formula as often as they like. Sliding or swiping the card causes the merchant terminal to display the date and time in a "frozen" manner, showing, for example: Date=Wednesday, Jul. 6/2011; Time=09:48:23. With the display of the date and time available to the cardholder (either at an ATM machine, a checkout counter, or a merchant terminal in a shopping center), it is easy to implement the system of the invention. If at an ATM machine, there is no clerk, but merely the screen/terminal that provides all prompts for the transaction. If at a merchant terminal, the frozen date and time may be seen by employees, but even then such employees will not be able to determine the formula used by the card owner to create the dynamic CIK.

As another non-limiting example, for a four-digit CIK, the first two digits can be the card owner's birth year (e.g. "85", if born in 1985), and the next two digits can be "00", and the formula can be "seconds+pre-stored CIK", meaning to add the seconds displayed at the merchant terminal to the pre-stored CIK. Therefore, the pre-stored CIK created by the card owner is 8500, and if the Time=09:48:23, then the dynamic CIK would be 8523. In this example, if the card had been swiped even one second later, at 09:48:24, then the dynamic CIK would be 8524. Should a prospective thief watch the card holder type in the dynamic CIK and then subsequently steal the card (or even the account information on the card) and try to use the card using the CIK that was typed in earlier, that earlier CIK would already be obsolete and not work. Also, in one embodiment, the CIK can be encrypted, such that typing in the CIK numbers will show a seemingly random string of letters, or even a set of bullets, at the terminal.

The present invention overcomes the vulnerability of the static PIN and CVV numbers by generating a dynamic CIK which can be newly determined for each different card transaction. The dynamic CIK may never be reused for a different transaction. Thus, the merchant, or anyone else observing the transaction, would be unable to duplicate the transaction or generate another transaction with the information provided. Any attempt to re-use a previously used dynamic CIK that is no longer valid would generate a security alert at the time of the attempted fraudulent transaction.

One requirement of the inventive system is that each cardholder must remember their pre-stored CIK and the formula of their choice for generating the dynamic CIK. However, both the pre-stored CIK and the formula for generating the dynamic CIK that are chosen by the card owner can be personal or familiar to the owner, and thus easy to remember. Many easy-to-remember numbers and formulas are available, and the combination of the two to generate the dynamic CIK will reduce, if not eliminate, fraud. With the reduction in the risk of fraud, store personnel can be made available for other tasks, and millions of dollars can be saved each year.

Indeed, the present invention envisions that the disclosed CIK system can replace the PIN system that is currently used for ATM cards and debit cards, and also the CVV system currently used for credit cards. The system of the invention can even allow card owners to keep their existing card PIN as their pre-stored CIK, if they prefer, and then use a formula of their choosing to generate the dynamic CIK at the time of purchase.

Since the invention utilizes the PIN and CVV number structures that are already in place, store equipment currently used to read and process ATM cards, debit cards and/or credit cards and communicate with the card processing center would be virtually unchanged. The changeover from PINs and CCVs would entail only a few changes to existing card verification software, such that the method and system of the present invention would be feasible as a replacement for these older systems, taking into account the amount of fraud that is currently taking place. Thus, the invention disclosed herein is simple, yet can aid in protecting both the general public and credit card companies from fraudulent credit cart activities.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope or spirit of the invention.

What is claimed is:

1. A method for authorizing a credit card transaction, comprising:
   a) creating an initial, pre-stored Card Identity Key, the pre-stored Card Identity Key being associated with a customer credit card;
   b) storing the pre-stored Card Identity Key in a computer database of a card-issuing financial institution, the computer database containing information associated with the customer credit card and adapted to communicate with a merchant terminal requesting authorization of the customer credit card;
   c) employing a software routine for validation of a transaction associated with the customer credit card, the software routine including a formula for changing the pre-stored Card Identity Key to generate a dynamic Card Identity Key, wherein the formula is created by the customer/credit card owner; and
   d) requiring a number to be entered at the merchant terminal by the card holder for validation of the transaction, wherein the software routine authorizes the transaction by confirming that the number entered by the card holder at the merchant terminal matches the dynamic Card Identity Key generated by the formula.

2. The method of claim 1, wherein the software routine refuses the transaction if the number entered at the merchant terminal does not match the dynamic Card Identity Key generated by the formula.

3. The method of claim 1, wherein the pre-stored Card Identity Key is created by the credit card owner.

4. The method of claim 1, wherein the pre-stored Card Identity Key is issued by the card-issuing financial institution.

5. The method of claim 1, wherein the internal time and date are displayed at the merchant terminal and are utilized in the formula to perform the validation.

6. The method of claim 1, wherein the last two digits of the pre-stored Card Identity Key are changed by the formula to generate the dynamic Card Identity Key.

7. The method of claim 1, wherein the first digit of the pre-stored Card Identity Key is variable and corresponds to one of multiple stored formulae used to convert the pre-stored Card Identity Key to the dynamic Card Identity Key.

8. A method for authorizing a credit card transaction, comprising:
   a) creating a pre-stored Card Identity Key for use in authorizing a customer credit card, wherein the pre-stored Card Identity Key is composed of digits and is associated with account information displayed on the customer's credit card, and wherein both the account information and the associated pre-stored Card Identity Key are stored in a computer database of a financial institution issuing the credit card;
   b) determining a formula for changing the pre-stored Card Identity Key to generate a dynamic Card Identity Key, wherein the formula is created by the customer/credit card owner
   c) swiping the customer credit card through an optical scanner at a merchant terminal in order to authorize a transaction with the credit card, the optical scanner adapted for reading the account information displayed on the customer credit card;

d) requesting input of the dynamic Card Identity Key at the merchant terminal;

e) comparing the dynamic Card Identity Key entered at the merchant terminal with the dynamic Card Identity Key generated by the formula;

f) validating that the dynamic Card Identity Key which was entered at the merchant terminal matches the dynamic Card Identity Key generated by the formula; and g) authorizing the transaction based on the validation that the dynamic Card Identity Key which was entered at the merchant terminal matches the dynamic Card Identity Key generated by the formula, wherein the authorizing step comprises the financial institution sending an authorization for the credit card transaction to the merchant.

9. The method of claim 8, further including the step of refusing the transaction if the dynamic Card Identity Key which was entered at the merchant terminal and the dynamic Card Identity Key generated by the formula do not match.

10. The method of claim 8, wherein the pre-stored Card Identity Key is created by the credit card owner.

11. The method of claim 8, wherein the internal time and date are displayed at the merchant terminal and are utilized in the formula to perform the validation.

12. The method of claim 8, wherein the last two digits of the pre-stored Card Identity Key are changed by the formula to generate the dynamic Card Identity Key.

13. The method of claim 8, wherein the first digit of the pre-stored Card Identity Key is variable and corresponds to one of multiple stored formulae used to convert the pre-stored CIK Card Identity Key to the dynamic CIK Card Identity Key.

14. A system for generating a sales transaction, comprising:

a) a terminal for communicating with the computer database of a card-issuing financial institution, the computer database containing information associated with a customer credit card, the terminal comprising:

i) an optical scanner adapted for reading customer account information displayed on the customer credit card;

ii) a keypad for entering information into the terminal; and iii) a display device for displaying transaction information;

b) a pre-stored Card Identity Key comprising digits; and c) a formula created by the customer/credit card owner for changing at least one digit of the pre-stored Card Identity Key to generate a dynamic Card Identity Key, wherein the optical scanner reads the customer account information from the customer credit card and the terminal communicates with the computer database of the card-issuing financial institution to obtain approval for the transaction.

15. The system of claim 14, wherein the internal time and date are displayed at the merchant terminal and are utilized in the formula to perform the validation.

16. The system of claim 14, wherein the last two digits of the pre-stored Card Identity Key are changed by the formula to generate the dynamic Card Identity Key.

17. The system of claim 14, wherein the first digit of the pre-stored Card Identity Key is variable and corresponds to one of multiple stored formulae used to convert the pre-stored CIK Card Identity Key to the dynamic CIK Card Identity Key.

* * * * *